May 24, 1949.  C. H. CAMPBELL  2,471,392
REFINING RECLAIMED RUBBER WITH COOLING OF THE
RUBBER TO FACILITATE SEPARATION OF TAILINGS
Filed Sept. 25, 1946
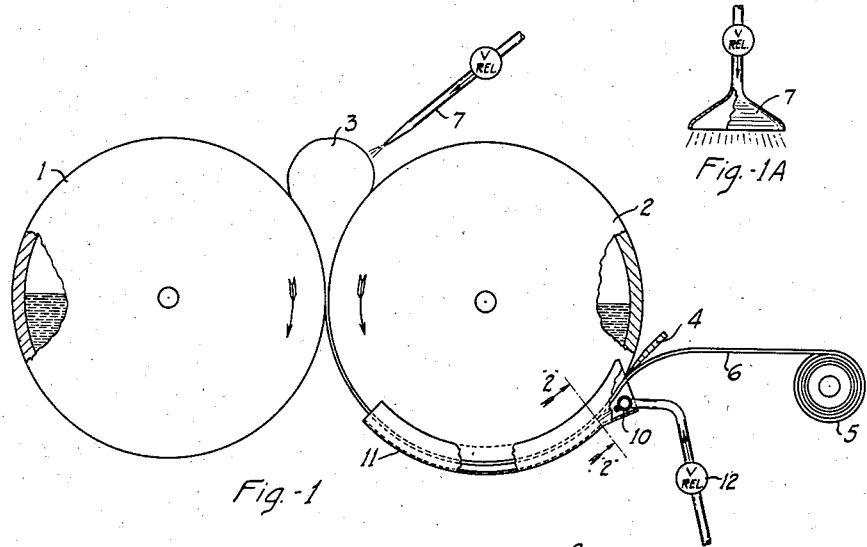
Fig.-1
Fig.-1A
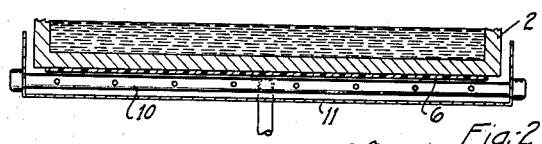
Fig.-2
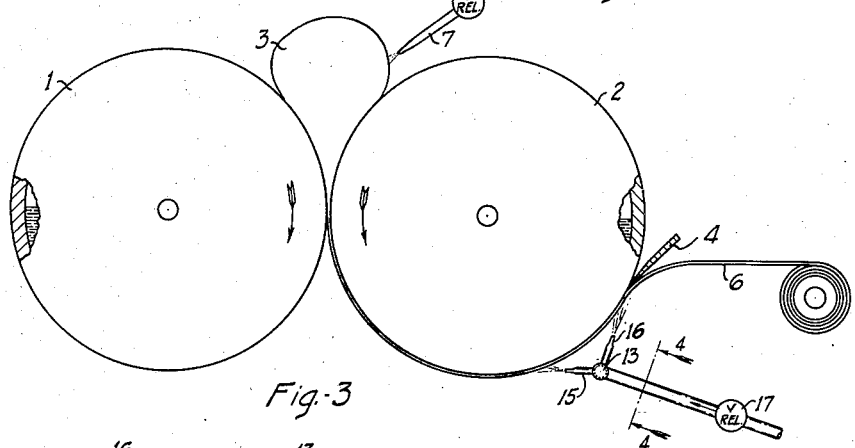
Fig.-3
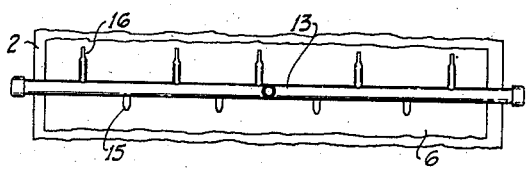
Fig.-4
INVENTOR.
CHARLES H. CAMPBELL
BY Patented May 24, 1949

2,471,392

UNITED STATES PATENT OFFICE 2,471,392

REFINING RECLAIMED RUBBER WITH COOLING OF THE RUBBER TO FACILITATE SEPARATION OF TAILINGS

Charles Herbert Campbell, Kent, Ohio

Application September 25, 1946, Serial No. 699,269

2 Claims. (Cl. 18—2)

This invention relates to an improved treatment of reclaimed rubber which is designed particularly for use in hot weather and especially in hot, humid weather. It may be used to advantage even in cold winter weather.

It is well known that during the hot summer months in the industrial sections of the United States—for example, in the latitude of Pennsylvania and Ohio, etc.—the volume of reclaimed rubber produced in the reclaiming plants is relatively low as compared with the output in the winter months. This is primarily due to overheating the scrap after devulcanization, during the milling period, because of inadequate internal cooling of the refining mill, sometimes called a refiner. Regardless of the number of passes made through the refiners, overheating causes the bank of rubber in the bite of the rolls to become doughy in character so that it becomes impossible to properly separate the tailings from the rubber. This is especially true in the reclaiming of synthetics due to the high percentage of oils used in the process.

Overheating, likewise, produces a sheet that is short in character, has low tensile strength, and breaks before it can be properly wound on the wind-up drum. These deficiencies in the sheet can be corrected by adequate cooling, provided such cooling is applied externally of the mill; that is, provided the cooling is applied to the surface of the rubber being milled and sheeted. Experience has shown that although such cooling is necessary in the summertime in order to maintain production of reclaim at a satisfactory level, it may be used to advantage even in the winter to keep the temperature of the rubber somewhat below the temperature now ordinarily employed.

The rolls of the refining mill are water cooled. The internal cooling systems now in vogue are inadequate to produce a sufficiently cool, finished sheet during the hot summer months. According to this invention internal cooling of the mills is supplemented by blowing a cold gas onto the finished sheet as it is being transferred to the wind-up drum. Cold gas is also preferably blown against the rubber bank in the bite of the rolls.

The tensile strength of the reclaimed rubber becomes less as its temperature is raised. The optimum temperature for reclaim of synthetic of high carbon content leaving the knife of a refining mill ranges from about 90 to 130° F. Higher or lower temperatures may be employed. The optimum temperature for milling a reclaim of natural rubber—which has a lower carbon content than a synthetic—is somewhat higher. The upper limit of the optimum range varies with the temperature and humidity of the atmosphere. The mills which heat the rubber to this temperature have rolls heated to 175° F. in the wintertime and a temperature as high as 240 to 260° F. in the summertime. The efficiency of the cooling system determines the actual temperature of the rolls and thus the temperature of the sheeted reclaim.

The additional cooling to which the invention relates is effected with a gas of lower temperature than the surrounding atmosphere, and this gas must have a relative humidity such that if heated to the temperature of the surrounding atmosphere, it would have a lower humidity than the surrounding atmosphere. Such a gas may be obtained from several sources. For instance, a tank of carbon dioxide or other gas under pressure might be used. It is well known that as a gas expands from confinement in a tank, its temperature drops. Thus a tank of carbon dioxide or other gas under pressure might be located near the mill and provided with a nozzle to direct the gas.

The most satisfactory cooling medium is compressed, dehydrated air. The ordinary air compressors, such as are found at the automobile service stations, use air under a pressure of about 120 pounds. The work so far done on the improved process which is the subject of this invention shows that higher compression is more desirable. Air released from a pressure of from 200 to 400 pounds or more is preferred to air which has been under lower pressure. Before compressing the air, it may be filtered by any acceptable process and then partially dehydrated to a point that any remaining moisture will not affect the moisture content of the finished reclaimed rubber sheet.

In a mill room in which there are several refining mills a central compression system will provide air for cooling the rubber on all of the mills. Such air may be delivered from the central station through pipes laid on the floor with a header or other distribution means for conveying the air to the several mills. Any suitable nozzle or perforated pipe may be used to direct the air onto the bank of reclaim and onto the sheet of finished rubber. As the air is released from compression, it expands and such expansion cools it, the temperature to which it is cooled depending upon the degree of expansion. The release valve through which the air expands is preferably located where it is easily available to the mill operator. After expansion the temperature of the air may be, for example, as low as about 40 to 60° F. although air of higher or lower temperature may be used satisfactorily. The most satisfactory temperature for any given arrangement depends upon the amount of air used, the temperature of the atmosphere, etc. The air may be more or less confined in contact with the sheeted rubber to advantage.

The invention will be further described in connection with the accompanying drawings, in which:

Fig. 1 is a side view of a conventional refining mill provided with additional equipment such as is contemplated by this invention;

Fig. 1A is a view of the flat side of the nozzle used for directing air into the bite of the rolls;

Fig. 2 is a view taken on the line 2—2 of Fig. 1;

Fig. 3 is a side view of optional equipment; and

Fig. 4 is a view taken on the line 4—4 of Fig. 3.

In Fig. 1 the rolls 1 and 2 are rolls of a conventional refining mill. They are hollow and contain cooling water which is circulated through them. The roll 2 is operated at a higher speed than the roll 1. The rolls turn in the direction of the arrows. A batch of reclaimed rubber 3 as it comes from the cookers, after straining, is fed into the bite of the rolls and is worked as the mill operates. A thin sheet of the reclaim which may, for example, be about .003 to .005 inch thick passes between the rolls, adheres to the roll 2, is scraped off by the knife 4, and goes to the wind-up 5. This thin sheet is identified by the reference numeral 6.

It is this sheet 6 which in hot weather gives difficulty. Heat is generated by the working of the rubber on the mill and the temperature of the rubber rises. When a fresh batch of rubber is placed on the mill, the first portion of this batch may be sheeted out and transferred to the wind-up 5 in good condition even in hot, humid weather. However, as the batch heats up, the cooling water 7 inside of the rolls is not sufficiently cold to prevent the mass 3 from becoming doughy and to maintain the sheeted rubber at the temperature at which it has sufficient tensile to be handled properly.

According to this invention a cooled gas is used to supplement the cooling of the cooling water inside the rolls of the mill. In a preferred process of operating, some of the cooled gas is directed against the bank of rubber in the bite by the nozzle 7. It is preferably directed between the bank of the rubber and the roll that is moving the fastest. The bank of the rubber is rolled toward this roll, and the cold gas is rolled into it and distributed throughout the bank of the rubber. This prevents the bank of rubber from getting so hot and doughy as to interfere with the separation of tailings.

Additional cold gas is blown through the perforated pipe 10 against the sheeted rubber 6. The shield 11 confines the cold gas, more or less, and keeps it in contact with the rubber as it is blown from one end of the space inside of the shield to the other. The relief valve 12 controls the expansion and delivery of the gas.

Alternatively, as shown in Figs. 3 and 4, the shield may be omitted. The cold gas is then directed against the sheeted rubber in such a way as to produce maximum cooling. The gas is advantageously blown from the header through forked jets, one branch 15 being substantially tangential to the sheeted rubber on the bottom of the roll 2, and the other branch 16 directed against the rubber as it approaches the knife 4. The relief valve 17 controls the release of the gas from pressure and the amount delivered for use.

The speed of rotation of the rolls 1 and 2 is such that only several seconds—perhaps 3 or 4 seconds—elapse between the time the sheet of rubber 6 leaves the bite between the rolls and the time it reaches the wind-up 5. Even though the sheet is heated, any moisture deposited on the ribbon from the air would not evaporate in the few seconds of time between the time the sheet leaves the bite and the time it reaches the wind-up. Thus, it is necessary to dehydrate the air, at least partially, if air be used. On humid days the reclaimed rubber must be as free as possible from moisture when it reaches the wind-up.

Various types of equipment may be employed in carrying out the process. That shown in the drawings is only illustrative. If desired, one might have an auxiliary air nozzle play on the sheeted rubber several inches after it passes the knife 4. The invention is not limited to the drawings but is defined in the accompanying claims.

What I claim is:

1. In the process of refining reclaimed rubber in which the reclaimed rubber fed from a bank in the bite of the rolls is worked between and sheeted out by the rolls of a two-roll refining mill which are cooled internally by cooling water circulated therethrough, one of which rolls is rotated at a higher speed than the other whereby the bank of rubber is rolled toward this roll, the improvement which comprises cooling the bank of rubber as it is being milled by blowing between the bank of the rubber and the roll that is rotating fastest, a gas of a lower temperature and lower relative humidity than the surrounding atmosphere.

2. In the process of refining reclaimed rubber in which the reclaimed rubber fed from a bank in the bite of the rolls is worked between and sheeted out by the rolls of a two-roll refining mill which are cooled internally by cooling water circulated therethrough, one of which rolls is rotated at a higher speed than the other whereby the bank of rubber is rolled toward this roll, the improvement which comprises cooling the bank of rubber as it is being milled by blowing between the bank of the rubber and the roll that is rotating fastest, air which has a temperature at least as low as 40° F. and is of lower relative humidity than the surrounding atmosphere.

CHARLES HERBERT CAMPBELL.

REFERENCES CITED

The following references are of record in the file of this patent:

UNITED STATES PATENTS

| Number | Name | Date |
|---|---|---|
| 1,590,638 | Marquette | June 29, 1926 |
| 1,850,061 | Jones | Mar. 15, 1932 |
| 1,953,721 | Olson et al. | Apr. 3, 1934 |